(12) United States Patent
Pfeifer

(10) Patent No.: US 7,493,629 B2
(45) Date of Patent: Feb. 17, 2009

(54) COMMUNICATION BETWEEN COMPUTERS OPERATING IN DIFFERENT OBJECT-ORIENTED RUN-TIME ENVIRONMENTS

(75) Inventor: Wolfgang Pfeifer, Kerzenheim (DE)

(73) Assignee: SAP Aktiengesellschaft, Walldorf ( * ) Notice: Subject to any disclaimer, the term of this patent is extended or adjusted under 35 U.S.C. 154(b) by 931 days.

(21) Appl. No.: 10/788,901

(22) Filed: Feb. 27, 2004

(65) Prior Publication Data

US 2004/0230985 A1 Nov. 18, 2004

Related U.S. Application Data

(63) Continuation of application No. PCT/EP02/09387, filed on Aug. 22, 2002.

(30) Foreign Application Priority Data

Sep. 26, 2001 (EP) ................... 01123052

(51) Int. Cl.
  G06F 3/00 (2006.01)
  G06F 9/44 (2006.01)
  G06F 9/46 (2006.01)
  G06F 13/00 (2006.01)
(52) U.S. Cl. ................ 719/330; 719/315; 719/316
(58) Field of Classification Search ......... 719/315–316, 719/330
See application file for complete search history.

(56) References Cited

U.S. PATENT DOCUMENTS 5,218,699 A   6/1993 Brandle et al.
5,475,817 A  12/1995 Waldo et al.
7,275,079 B2 * 9/2007 Brodsky et al. ............. 709/203
2002/0038335 A1 * 3/2002 Dong et al. ................. 709/203

FOREIGN PATENT DOCUMENTS

EP   1 122 644 A1   8/2001

OTHER PUBLICATIONS

Yi-Hsiu Wei, Alexander D. Stoyenko, and German S. Goldszmidt, *The Design of a Stub Generator for Heterogeneous RPC Systems*, Mar. 11, 1991, Journal of Parallel and Distributed Computing, XP 000201905, pp. 188-197.

(Continued)

*Primary Examiner*—Meng-Ai An
*Assistant Examiner*—Qing-Yuan Wu
(74) *Attorney, Agent, or Firm*—Fish & Richardson P.C.

(57) ABSTRACT

First and second computers (901, 902) operate in first and second object-oriented run-time environments with first and second applications (201, 202) and corresponding objects (A1/A2, B1/B2, C1/C2). Initiated by a communicator (101) and supported by a network (990), the first computer (901) sends a message (GET 111, SET 121, INSTRUCT 131) with object and action identification to the second computer (902). The second computer (902) uses an interpreter (102) to identify an object (A2, 152) in the second run-time environment according to the object identification. The interpreter (102) further verifies the existence of the identified action for the object (A2, 152) in the second run-time environment and determines (403) a representation of the action in the second run-time environment for the identified object (A2, 156). The interpreter (102) then executes the action by using the representation. Thereby, the interpreter (102) calls properties and methods of the identified object (A2, 156).

19 Claims, 8 Drawing Sheets

| MESSAGE → | | OBJECT ID | ACTION ID | |
|---|---|---|---|---|
| | | 115 | 116 | 117 |
| GET | 111 | A | PROPERTY "COLOR" | REQUEST GET COLOR |
| | | 125 | 126 | 127 |
| SET | 121 | A | PROPERTY "COLOR" | REQUEST SET TO RED ° |
| | | 135 | 136 | 137 |
| INSTRUCT | 131 | A | FUNCTION CALCULATE | PARAMETERS • METALLIC ° • X • Y |

OTHER PUBLICATIONS

Andrew D. Birrell and Bruce Jay Nelson, *Implementing Remote Procedure Calls*, Feb. 1984, ACM Transactions on Computer Systems, vol. 2, No. 1, XP-002074181, pp. 39-59.

Yen-Min Huang and Chinya V. Ravishankar, *URPC: A Toolkit for Prototyping Remote Procedure Calls*, 1996, The Computer Journal, vol. 39, No. 6, XP 000639358, pp.525-540.

EPO, Communication Pursuant to Article 96(2) EPC, Application No. 01 123 052.1-2211, 4 pages.

EPO, Communication Pursuant to Article 96(2) EPC, Mar. 2006 Application No. 01 123 052.1 - 2211, 4 pages.

EPO Communication Pursuant to Article 94(3) EPC issued in European Application No. 01 123 052.1 - 2211 dated Aug. 14, 2008, 6 pages.

Jerome Daniel, et al., "Active COM: An Inter-working Framework for CORBA and DCOM," IEEE, 1999, pp. 211-222. XP010352179 International Symposium on Distributed Objects and Applications (12 pages).

* cited by examiner

| MESSAGE ↓ | | OBJECT ID | ACTION ID | |
|---|---|---|---|---|
| GET | 111 | 115 A | 116 PROPERTY "COLOR" | 117 REQUEST GET COLOR |
| SET | 121 | 125 A | 126 PROPERTY "COLOR" | 127 REQUEST SET TO RED° |
| INSTRUCT | 131 | 135 A | 136 FUNCTION CALCULATE | 137 PARAMETERS • METALLIC° • X • Y |

FIG. 3

| MESSAGE ↓ | OBJECT ID | RESPONSE ID | |
|---|---|---|---|
| RESULT 112 | 115 A | 116 PROPERTY "COLOR" | 118 COLOR GREEN° |
| CONFIRM 122 | 125 A | 126 PROPERTY "COLOR" | 128 YES, SET TO RED° |
| FEEDBACK 132 | 135 A | 136 FUNCTION CALCULATE | 138 PARAMETERS<br>• METALLIC°<br>• 20 LITER°<br>• 1000 EURO° |

FIG. 4

OBJECT A2 152

| PROPERTY 162 | FUNCTION / PARAMETER 172 |
|---|---|
| RED °° <br> YELLOW °° <br> GREEN °° | CALCULATE <br> • COLOR TYPE °° <br> • VOLUME °° <br> • PRICE °° |

FIG. 5

| 161 REPRESENTATION FIRST RTE | 162 REPRESENTATION SECOND RTE |
|---|---|
| RED ° | RED °° |
| YELLOW ° | YELLOW °° |
| GREEN ° | GREEN °° |

COMMUNICATION BETWEEN COMPUTERS OPERATING IN DIFFERENT OBJECT-ORIENTED RUN-TIME ENVIRONMENTS

CROSS-REFERENCE TO RELATED APPLICATIONS

Under 35 U.S.C. § 120, this application is a continuation application of international application number PCT/EP02/09387 filed on Aug. 22, 2002, and designating the U.S., which claims priority from EP application no. 01123052.1, filed Sep. 26, 2001.

FIELD OF THE INVENTION

The present invention generally relates to data processing and, more particularly, relates to computer systems, computer programs, and methods to use properties and methods of objects in computer business applications.

BACKGROUND OF THE INVENTION

Computer applications often use object-oriented programming techniques. In the applications, objects are data structures with properties and methods. For convenience of explanation, the term "function" is used instead so that an object has properties and functions.

The objects are often arranged in hierarchy. Reading ("GET") and modifying ("SET") a property or executing a function ("INSTRUCT") requires identification (ID) of the object within the hierarchy, for example, by an object name.

Technically, each object operates in a run-time environment, that means in a predefined technical format for the object ("object model"). For example, (a) the ID is a string with a predetermined number of characters and (b) an output value is an integer.

Multiple applications are often linked in a network so that using a single run-time environment is often impossible. When first and second computer applications operate in different first and second run-time environments, they conveniently use similar objects with similar properties and functions.

However, similarity alone does not guarantee technical compatibility. Translation software between the applications is required as well. Linking the application by communication middleware is well known in the art. Middleware is commercially available, such as for example, COM, DCOM, and CORBA.

For example, a first run-time environment (provider) needs to communicate with an identified object in a second run-time environment (consumer). Such communication often involves multiple hierarchy levels of objects. Going through multiple hierarchy levels by both environments technically causes network load and delays.

There is an ongoing need to provide improved inter-run-time communication means so that some or all of the above disadvantages are mitigated.

SUMMARY OF THE INVENTION

The present invention relates to a method for communication between a first computer operating in a first object-oriented run-time environment and a second computer operating in a second, different object-oriented run-time environment.

The first run-time environment accesses a property or a function of an object, hereinafter "action", in the second run-time environment. The first computer sends a first message with object identification and action identification to the second computer and causes the second computer to perform the following steps: identifying the object in the second run-time environment according to the object identification; verifying the existence of the action in the identified object in the second run-time environment; determining a representation of the action in the second run-time environment for the identified object; and executing the action by using the representation, thereby returning a second message to the first computer as a confirmation message to the first computer, the second message with object identification and response identification, executing with (a) converting a request identification that is part of the action identification to a further representation for the second run-time environment by looking up in a table; and (b) inserting the further representation into the second application.

While identifying, interaction between the computers is not required; and execution is technically independent from the first run-time environment, since only the second run-time environment has to be used.

The invention also relates to a computer program product and to a communication system that implement the method.

BRIEF DESCRIPTION OF THE DRAWINGS

FIG. 3 illustrates messages from the first computer to the second computer;

FIG. 4 illustrates messages from the second computer to the first computer;

FIG. 5 illustrates an object in the second application on the second computer;

FIG. 6 illustrates a conversion table in the second application on the second computer;

COMPUTER SYSTEM IN GENERAL

Figure 1:
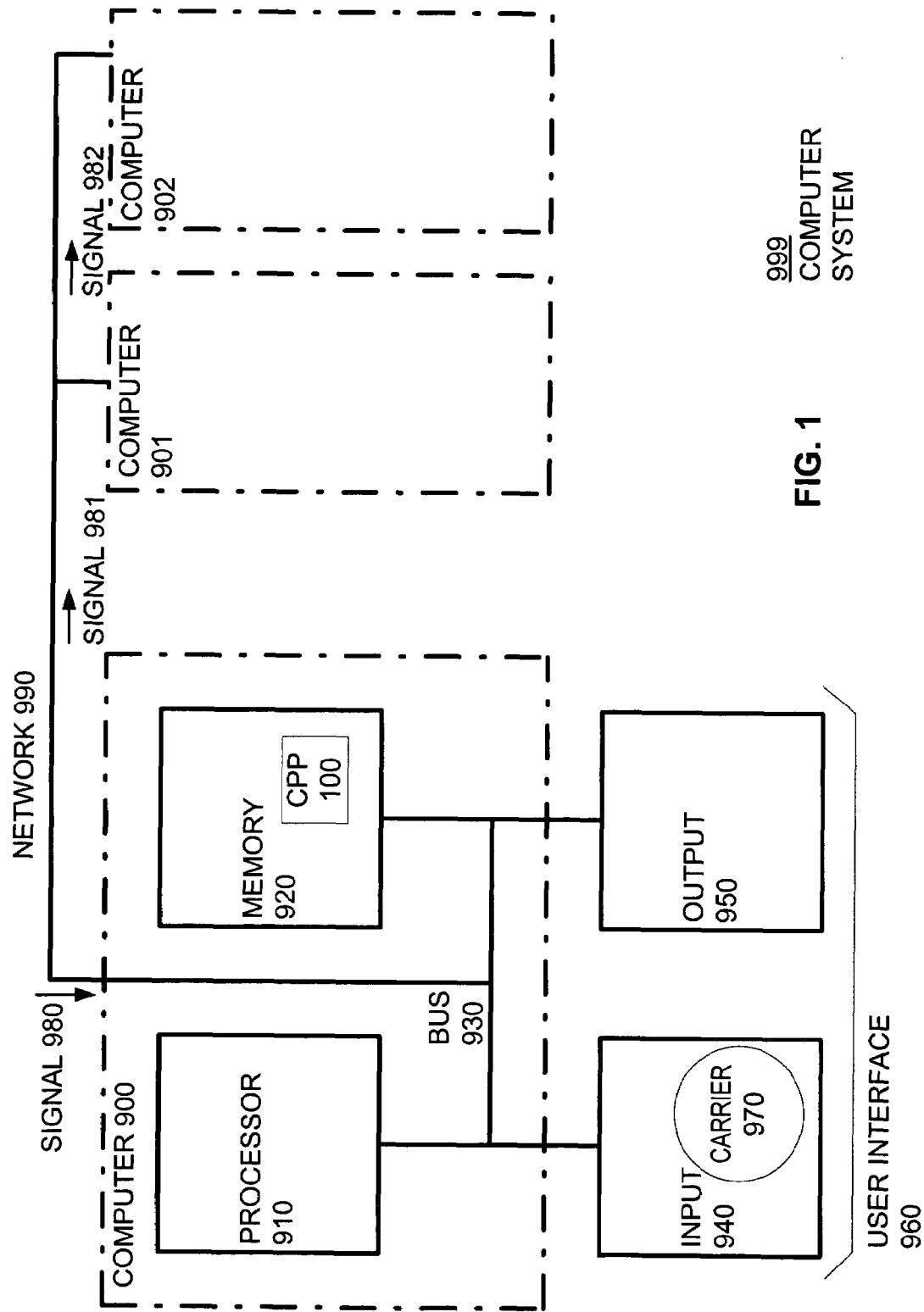
FIG. 1 illustrates a simplified block diagram of a computer network system having a plurality of computers.

FIG. 1 illustrates a simplified block diagram of exemplary computer system 999 having a plurality of computers 900, 901, 902 (or even more).

Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program product 100 (CPP), carrier 970 and signal 980.

In respect to computer 900, computer 901/902 is sometimes referred to as "remote computer", computer 901/902 is, for example, a server, a peer device or other common network node, and typically has many or all of the elements described relative to computer 900.

Computer 900 is, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 is an element or elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick.

Optionally, memory 920 is distributed. Portions of memory 920 can be removable or non-removable. For reading from media and for writing in media, computer 900 uses well-known devices, for example, disk drives, or tape drives. Memory 920 stores modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 has program instructions and—optionally—data that cause processor 910 to execute method steps of the present invention. In other words, CPP 100 can control the operation of computer 900 and its interaction in network system 999 so that it operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture having a computer readable medium with computer readable program code to cause the computer to perform methods of the present invention. Further, signal 980 can also embody computer program product 100.

Having described CPP 100, carrier 970, and signal 980 in connection with computer 900 is convenient. Optionally, further carriers and further signals embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), a counter (e.g., a goods counter in a factory). Input device 940 can serve to read carrier 970.

Output device 950 presents instructions and data that have been processed. For example, this can be a monitor or a display, (cathode ray tube (CRT), flat panel display, liquid crystal display (LCD), speaker, printer, plotter, vibration alert device. Output device 950 can communicate with the user, but it can also communicate with further computers.

Input device 940 and output device 950 can be combined to a single device. Any device 940 and 950 can be provided optionally.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways which are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., world wide web). Network 990 can be a wired or a wireless network. To name a few network implementations, network 990 can be, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

A variety of transmission protocols, data formats and conventions is known, for example, as transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

DETAILED DESCRIPTION OF THE INVENTION

For convenience, a list of references is provided prior to the claims.

Figure 2:
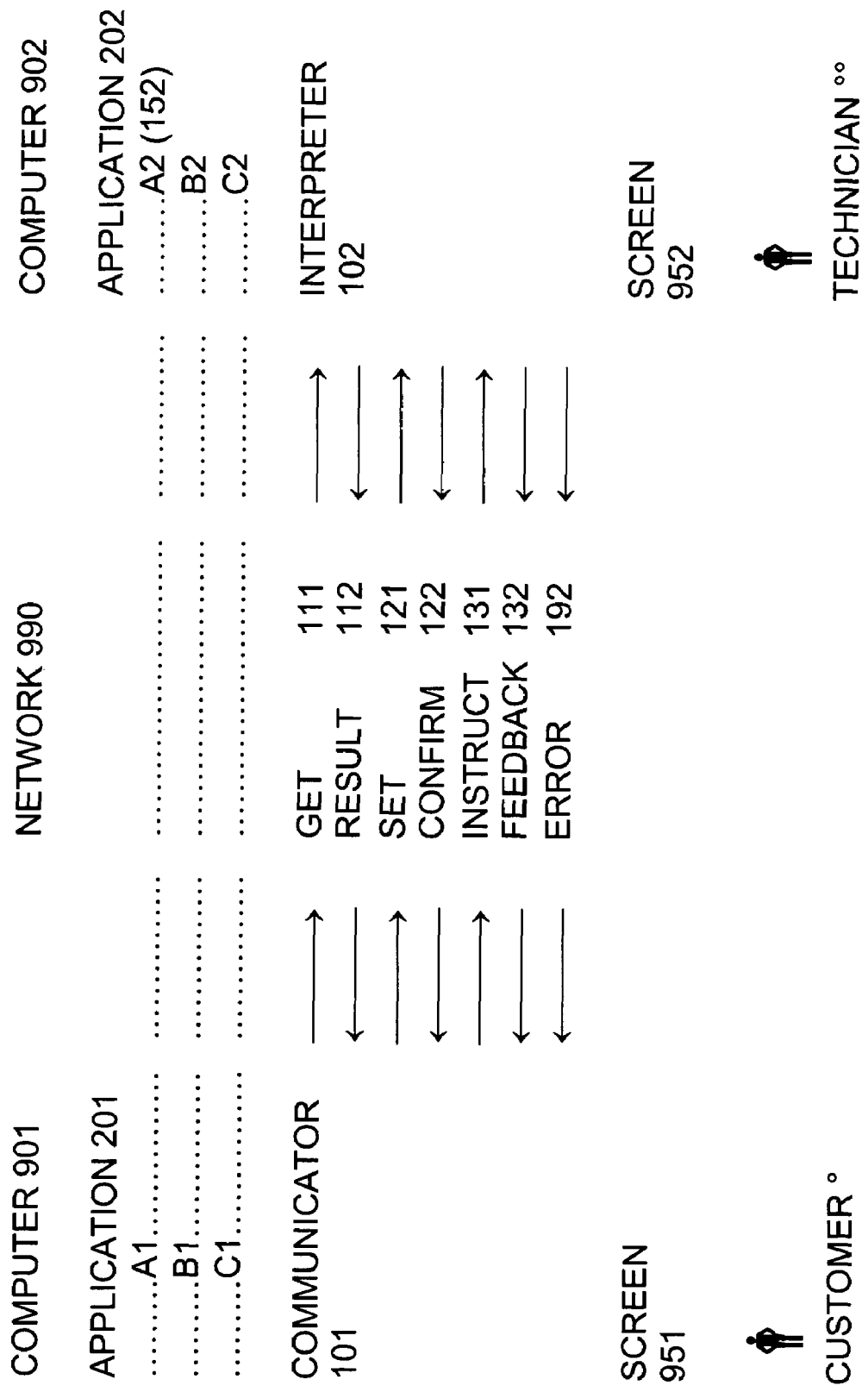
FIG. 2 illustrates a simplified block diagram of first and second computers with first and second applications, in first and second run-time environments, respectively, that communicate according to the present invention.

FIG. 2 illustrates a simplified block diagram of first computer 901 and second computer 902 that communicate according to the present invention. Computers 901 and 902 perform applications 201 and 202, in first and second run-time environments, respectively.

Application 201 operates in a first run-time environment that has a first object model; application 202 operates in a second, different run-time environment that has a second object model. Objects A1, B1 and C1 in application 201 correspond to objects A2, B2 and C2 in application 202. FIG. 2 illustrates this mapping by dotted lines. For explanation, distinguishing the letters A, B and C provides sufficient object identification. Indices 1 and 2 conveniently distinguish the computers.

Object A2 is explained with more detail in FIG. 5 (reference 152).

In operation, computers 901 and 902 preferably visualize their performance on screens 951 and 952 to first and second users, respectively. For example, screen 951 on computer 901 shows representations obtained from computer 902 (cf. FIG. 4, 118, 128, 138). Both users are mentioned here only for convenience of explanation; the present invention does not require them to be involved.

Network 990 (cf. FIG. 1) is the infrastructure to convey information between computers 901 and 902 in both directions. In both computers, first and second run-time environments cooperate with each other, preferably, by sending messages through network 990. The messages are convenient for explanation, but not essential for the present invention. In the alternative, the communication is performed by computer middleware, such as COM or CORBA, well known in the art and not further illustrated.

Communicator 101 operates on computer 901 as a message generator and sends messages GET 111, SET 121, INSTRUCT 131 to computer 902 (arrows to the right). As explained in connection with FIG. 3, the messages carry object identification and action identification.

Interpreter 102 (i.e. CPP) operates on computer 902 as message interpreter according to a method of the present invention (cf. FIG. 4). Interpreter 102 sends messages RESULT 112, CONFIRM 122, FEEDBACK 132 and ERROR 192 to computer 901. As explained in connection with FIG. 4, the messages carry object ID and response ID. It is an advantage of the present invention that the response ID has representations of object properties and object functions suitable for the first run-time environment of computer 901. As mentioned, the representations can be shown on screen.

There is no need to use all messages that are illustrated in FIG. 2. Preferably, the messages are exchanged as paired messages (the first message from computer 901, the second messages from computer 902), each pair for an embodiment of the present invention (GET/RESULT, SET/CONFIRM and INSTRUCT/FEEDBACK).

The first embodiment relates to the action of reading (GET) a property of an object (A) und uses messages GET 111 and RESULT 112. The second embodiment relates to the action of modifying (SET) a property of the object (A) and uses messages SET 121 and CONFIRM 122. The third embodiment relates to the action of executing (INSTRUCT) a function of the object (A) and uses messages INSTRUCT 131 and FEEDBACK 132. Error message 192 from computer 902 to computer 901 is optionally used in all embodiments.

An exemplary scenario relates to the automotive industry. A customer ("first user") uses first application 201 to customize a car; a technician ("second user") in a factory uses second application 202 to respond to the customer. Software objects correspond to hardware components; objects A, B and C correspond to cars ALPHA, BETA, and GAMMA, respectively (not shown). Applications 201 and 202 communicate with their users in first° and second°° natural languages (e.g., German and Spanish). To conveniently describe the invention in a single language, symbols° and°° distinguish first and second natural languages, respectively. For example, "green°" stands for the German word "grün" and "green°°" stands for the Spanish word "verde", both in the same meaning of green color. In a real implementation, these superscripts are not shown.

For convenience of explanation, the example scenario further assumes consecutive execution of the embodiments. The customer for ALPHA
first, asks for the color ("GREEN°"),
second, changes the color ("to RED°"), and
third, communicates with applications 201 and 202 to check volume ("LITER°") and price ("EURO") for a desired color type ("METALLIC°").

FIG. 3 illustrates messages GET 111, SET 121 and INSTRUCT 131 from computer 901 to computer 902 (cf. FIG. 2, arrows to the right). The messages comprise object identification (ID) 115, 125 or 135 (e.g., object A) and action identification (ID) 116/117, 126/127, or 136/137. For first or second embodiments, the action ID comprises property ID 116 or 126 and request ID 117 or 127. For the third embodiment, the action ID comprises function ID 136 and parameter ID 137 (parameter representation).

FIG. 4 illustrates messages RESULT 112, CONFIRM 122, and FEEDBACK 132 from computer 902 to computer 901 (cf. FIG. 2, arrows to the left). The messages comprise object ID 115, 125 or 135 (e.g., object A, as in FIG. 3) and response ID 116/118 or 126/128 or 136/138.

For first or second embodiments, the response ID comprises property ID 116 or 126 (as in FIG. 3) and property representation 118 or 128. Property representation is that of first run-time environment in computer 901.

For the third embodiment, the response ID comprises function ID 136 (as in FIG. 3) and parameter representation 138. Function and parameter representation are suitable to first run-time environment of computer 901.

The messages in FIGS. 3-4 are now explained in connection with the embodiments. So far, error messages 192 are neglected.

In the first embodiment, the customer needs to know the color of the car ALPHA. Application 201 uses object A1 and communicator 101 to send GET 111 with object ID 115 "A", property ID 116 "COLOR", and request ID 117 "GET COLOR" (action).

At computer 902, interpreter 102 executes a method (cf. 410 in FIG. 8) in combination with corresponding object A2 (of application 202) and returns RESULT 112 with corresponding object ID 115 and property ID 116, but with property representation 118 "COLOR GREEN°" (response). Representation 118 is in the suitable format for application 201. Application 201 now indicates "Green°" to the customer (e.g. on screen 951).

The role of user of application 202 is optional. When executing the method, interpreter 102 converts representations to and from the different run-time environments. It is convenient (but not necessary) that application 202 shows the color to the technician in the second language°° or invites the technician to input the color in this second language°°.

In the second embodiment, the customer wishes to set the color of the car ALPHA to "red". Application 201 uses object A1 and communicator 101 to send SET 121 to application 202 with object ID 125 "A", property ID 126 "COLOR", and request ID 127 "SET TO RED°".

At computer 902, interpreter 102 executes a method (cf. 420 in FIG. 8) in combination with corresponding object A2 (of application 202) and returns CONFIRM 122 to application 201 with corresponding object ID 125 and property ID 126, but with property representation 128 "YES, SET TO RED°".

In the third embodiment, the customer communicates with applications 201 and 202 to check price and volume for a desired color type. Application 201 again uses object A1 and communicator 101 to send INSTRUCT 131 to application 202 with function ID 136 "CALCULATE" and parameter ID 137 "COLOR TYPE°=METALLIC°°", "VOLUME°=X", "PRICE°=Y". The parameters are input parameter (COLOR TYPE) and output parameters (VOLUME, PRICE).

At computer 902, interpreter 102 executes the method in combination with corresponding object A2. Interpreter identifies object A2, verifies the parameters of A2, determines parameter representations, converts representations to the second-run time environment, triggers application 202 to execute the calculations, converts the calculation results X°° and Y°° to representations for the first run-time environment, and returns FEEDBACK 132 that indicates the output parameters (X°° and Y°°) as numeric values.

Before explaining the methods, details for the software on computer 902 are given.

FIG. 5 illustrates object 152 (A2) in application 202 of second computer 902. Object A2 has property COLOR. COLOR has a plurality of property representations 162 (RED°°, YELLOW°°, and GREEN°°) in the second run-time environment. In the example of FIG. 5, COLOR is represented by strings in the second natural language (°°). One representation of COLOR is being selected (e.g. GREEN°°). For the third embodiment, object A2 also has function 172 CALCULATE with parameters COLOR TYPE, VOLUME, and PRICE.

FIG. 6 illustrates conversion table 182 (mapping table) in application 202 (optionally in interpreter 102) on computer 902. Due to different run-time environments in computers 901 and 902, properties and functions of corresponding objects are represented differently. Table 182 illustrates property representations 161 and 162. According to the present invention, interpreter 102 on computer 902 converts representations 161 from the format of the first run-time environment (RTE) to representations 162 (cf. FIG. 5) in the format of the second run-time environment and vice versa. As an example, table 182 converts string representations in the first language (°) of the property COLOR to a string representation in the second language (°°). Again, using natural languages is convenient for explanation; in practice there is great variety of conversion between different object models, such as integer-to-real number conversion; string-to-string conversion; one-byte character representation (e.g., ASCII) to double-byte representation (e.g., unicode), etc.

Persons of skill in the art can provide further property conversion means, for example: string-to-integer, integer-to-real, 4-byte-integer to 8-byte-integer, etc. and vice versa. Table 182 illustrates property representations only; function conversion including parameter conversion is likewise to the property conversion, persons of skill in the art can accomplish this without the need of further explanation herein.

Figure 7:
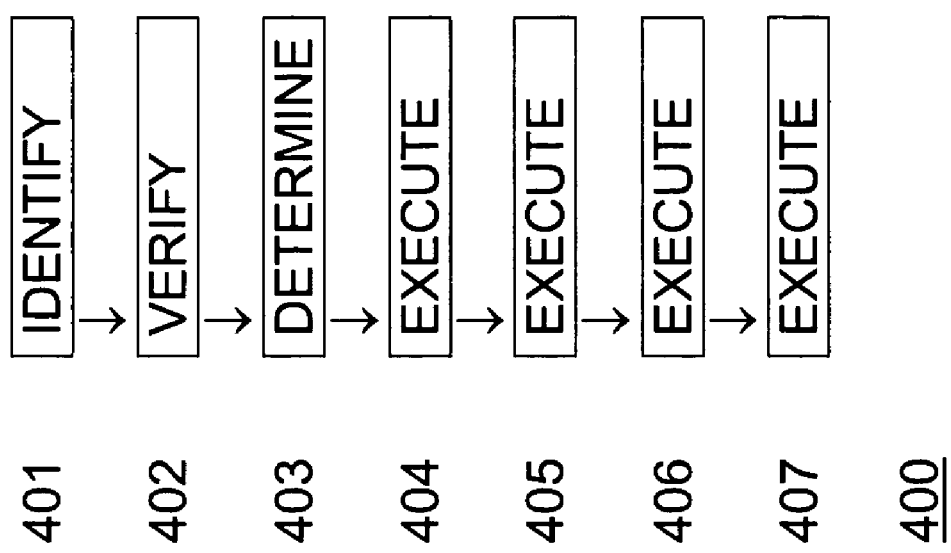
FIG. 7 illustrates a flowchart diagram for a method of the present invention in general.

FIG. 7 illustrates flowchart diagrams for method 400 of the present invention, with method 400 being a generalization for all embodiments.

Figure 8:
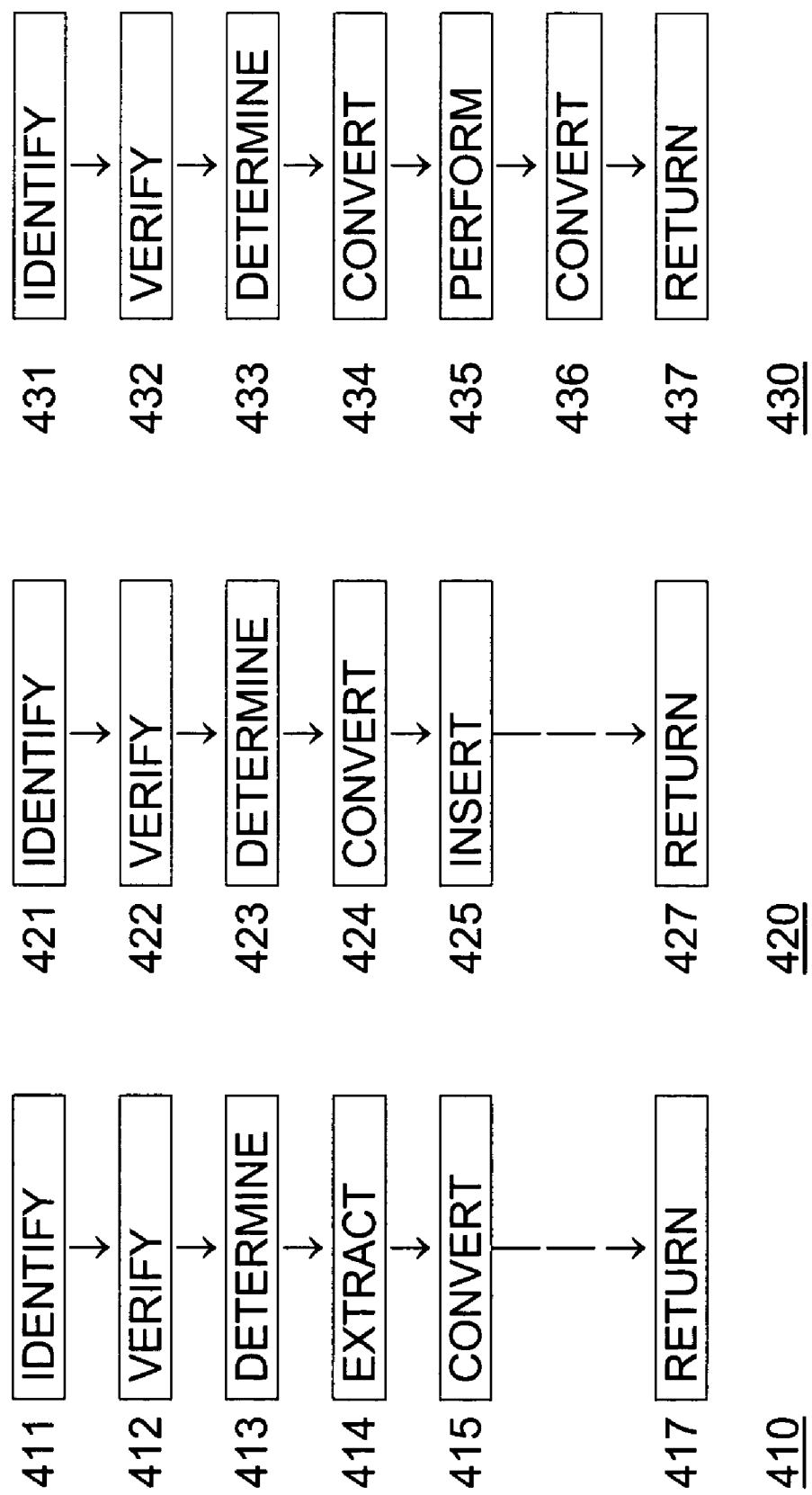
FIG. 8 illustrates flowchart diagrams for the method of FIG. 7 for first, second and third embodiments.

FIG. 8 illustrates flowchart diagrams for the embodiments: first method 410, second method 420 and third method 430.

Generally, method 400 relates to communication between first computer 901 operating in a first object-oriented run-time environment and second computer 902 operating in a second, different object-oriented run-time environment, wherein computer 901 sends message (GET 111, SET 121, or INSTRUCT 131) with object ID 115, 125, 135 and action ID 116/117, 126/127 or 136/137 to second computer 902 and causes second computer 902 to perform the method steps identify 401, verify 402, determine 403, and execute 405, 404, 406, 407. The method steps are performed by interpreter 102 in combination with application 202 after computer 902 has received message 111, 121, or 131.

In the step of identifying 401 an object in the second run-time environment according to object ID 115, 125, 135, interpreter 102 identifies the corresponding object in application 202 by evaluating the object ID of the message. Step 401 is likewise for all embodiments, i.e. steps 411, 421, and 431. In the example scenario, with object ID "A", the object is A2 (cf. FIG. 5).

In the step of verifying 402, interpreter 102 verifies the existence of the action in the identified object in the second run-time environment. In the first and second embodiments, steps 412 and 422, interpreter evaluates action identifier 116 and 126 and determines existence or non-existence of PROPERTY COLOR. In case of non-existence, interpreter 102 issues error message 192 (cf. FIG. 2). In the third embodiment, step 432, interpreter evaluates action identifier 136 and determines existence or non-existence of function CALCULATE.

In the step of determining 403 a representation 162 of action in the second run-time environment for the identified object, interpreter 102 operates for each embodiment slightly different. In the first and second embodiments, steps 413 and 423, interpreter 102 determines that representations 162 are in string format (cf. FIG. 5, °°). In the third embodiment, step 433, interpreter determines that the function has representation 172 (cf. FIG. 5).

In the steps of executing 404, 405, 406 and 407, interpreter 102 executes the action by using representation 162 (or 172). Interpreter 102 thereby operates for each embodiment in a slightly different manner. A common feature is obtaining the requested information (EXTRACT 414, PERFORM 435), converting formats (CONVERT 415, CONVERT 424, CONVERT 436) and returning messages (RETURN 417, 427, 437). Messages 112, 122, 132 to computer 901 comprise object ID 115, 125, 135 and response ID 116/118, 126/128, 136/138. The following description now conveniently splits into first, second and third embodiments.

First Embodiment

In the step of extracting 414, interpreter 102 extracts representation 162 of property COLOR that is identified by action ID 116 (in GET 111). So far representation 162 has the format for the second run-time environment (e.g., GREEN°°).

In the step of converting 415, interpreter 102 converts representation 162 (GREEN°°) to a further representation (GREEN°, 161) for the first run-time environment, for example, by reading from table 182 (cf. FIG. 5).

In the step of returning 417, interpreter 102 returns message RESULT 112 to the first computer with object ID 115 and response ID 116/118 (cf. FIG. 4). Response ID 116/118 comprises representations for the first run-time environment (GREEN°) as property representation 118. In other words, interpreter 102 includes the extracted property into message 112 in a format suitable for the run-time environment of message-receiving computer 901.

Second Embodiment

As property data is communicated to computer 902, extracting and converting change order, and inserting replaces extracting.

In the step of converting 424, interpreter 102 converts request ID 127 (part of the action ID 126/127) to representation 162 for the second run-time environment. For example, interpreter 102 uses look-up table 182 (cf. FIG. 3) to convert RED° to RED°°.

In the step of inserting 425, interpreter 102 inserts representation 162 into application 202. In the example scenario, RED° is stored in application such that car ALPHA will actually be painted red.

In the step of returning 427, interpreter 102 sends message 122 to computer 901. As explained above, CONFIRM 122 has object ID 125 and response ID 126/128 with property representation 128.

Third Embodiment

Executing comprises converting 434, performing 435, converting 436, and returning 437 steps. Function parameters are treated similar to properties.

In the step of converting 434, interpreter 102 converts function ID 136 and parameter ID 137 of action ID 136/137 to function and parameter representations 172 (cf. FIG. 5) for the second run-time environment. For example, the function CALCULATE with its parameters COLOR TYPE (e.g., METALLIC), VOLUME (e.g., X) and PRICE (e.g., Y) is converted.

In the step of performing 435, interpreter 102 causes the identified object of application 202 to actually provide the output parameters. The object uses function and parameter representations 172 for the second run-time environment. In the example, object A2 calculates VOLUME by multiplying the surface area of the car (e.g., square meters) with an area specific volume (e.g., liters per square meter), and object A2 also calculates PRICE my multiplying VOLUME with a specific price for METALLIC (e.g., currency per liters). The parameter representations are still in the second run-time environment.

In the step of converting 436, interpreter 102 converts the parameters (that result from performing step 435) into further representations 138 for the first run-time environment. For example, interpreter 102 converts VOLUME into a numeric representation suitable for the first run-time environment (e.g., integer to real number conversion; optionally conversion of physical units); interpreter 102 converts PRICE into a numeric representation suitable for the first run-time environment, conveniently with currency conversion.

In the step of returning 437, interpreter 102 returns feedback message 132 to computer 901 with object ID 135 and response ID 136/138. Response ID 136/138 comprises the further representations for the first run-time environment.

Optionally, function CALCULATE uses property COLOR (cf. first and second embodiments). This is convenient, for example, when COLOR influences output parameters such as PRICE.

List of Reference Numbers

| Reference | Element | Embodiment |
|---|---|---|
| 101 | communicator | |
| 102 | interpreter (CPP) | |
| 111 | GET message | first |
| 112 | RESULT message | first |
| 115 | object ID | first |
| 116 | property ID | first |
| 116/117 | action ID | first |
| 116/118 | response ID | first |
| 117 | request ID | first |
| 118 | property representation | first |
| 121 | SET message | second |
| 122 | CONFIRM message | second |
| 125 | object ID | second |

-continued

List of Reference Numbers

| Reference | Element | Embodiment |
|---|---|---|
| 126 | property ID | second |
| 126/127 | action ID | second |
| 126/128 | response ID | second |
| 127 | request ID | second |
| 128 | property representation | second |
| 131 | INSTRUCT message | third |
| 132 | FEEDBACK message | third |
| 135 | object ID | third |
| 136 | function ID | third |
| 136/137 | action ID | third |
| 136/138 | response ID | third |
| 137 | parameter ID | third |
| 138 | parameter representation | third |
| 152 | object A2 | |
| 161 | object representation, first RTE | |
| 162 | object representation, second RTE | |
| 172 | function and parameter representation | third |
| 182 | conversion table | |
| 192 | ERROR message | all |
| 201 | application | |
| 202 | application | |
| 400 | method and steps | |
| 401-407 | method steps | all |
| 41x | method and steps | first |
| 42x | method and steps | second |
| 43x | method and steps | third |
| 901 | computer | |
| 902 | computer | |
| 951, 952 | screens | |
| 990 | network | |
| A1, B1, C1 | objects | |
| A2, B2, C2 | objects | |
| ID | identification | |
| RTE | run-time environment | |
| xx1, xx2 | indices to distinguish computers | |

What is claimed is:

1. A method for communication between a first computer operating in a first object-oriented run-time environment and a second computer operating in a second, different object-oriented run-time environment, the method comprising:

receiving a first message with an object identification and an action identification from the first computer to the second computer;

identifying an object in the second run-time environment according to the object identification;

verifying an existence of an action, according to the action identification, in the identified object in the second run-time environment;

determining an action representation of the action, according to the action identification, in the second run-time environment for the identified object; and executing the action using the action representation, wherein executing the action includes:

converting a request identification that is part of the action identification to a second representation for the second run-time environment using a look-up table; and inserting the second representation into the second run-time environment.

2. The method of claim 1 further comprising returning to the first computer a second message as a confirmation message with an object identification and a response identification.

3. The method of claim 2 further comprising displaying, using the first computer, at least a portion of the response identification.

4. The method of claim 1, wherein executing the action further comprises:
   extracting a second property representation of a property identified by the action identification;
   converting the second property representation to a first property representation for the first run-time environment; and
   returning to the first computer a second message as a result message with an object identification and a response identification, the response identification indicating the first property representation for the first run-time environment.

5. The method of claim 4 further comprising displaying, using the first computer, at least a portion of the response identification.

6. The method of claim 1, further comprising: receiving a second message with a second object identification and a second action identification from the first computer to the second computer;
   identifying a second object in the second run-time environment according to the second object identification;
   determining a second action representation of a second action, according to the second action identification, in the second run-time environment for the identified second object; and
   executing the second action using the second action representation, wherein executing the second action further comprises:
      converting a function identification and a parameter identification of the second action identification to function and parameter representations for the second run-time environment;
      performing a function that is identified by the second action identification using the function and parameter representations for the second run-time environment;
      converting parameters that result from performing the function into parameter representations for the first run-time environment; and
      returning a third message to the first computer with an object identification and a response identification, with the response identification indicating the parameter representations.

7. The method of claim 6 wherein converting parameters uses a look-up table.

8. The method of claim 6, the second object identified in the second message being the first object identified in the first message.

9. A computer program product used in a communication system of a first computer with a first object-oriented run-time environment and a second computer with a second, different object-oriented run-time environment, wherein the first computer sends a first message with an object identification and an action identification to the second computer, the computer program product embodied on a carrier and having computer code instructions to cause a processor of the second computer to interpret the first message, the instructions comprising:
   code for identifying an object in the second run-time environment according to the object identification;
   code for verifying the existence of an action, according to the action identification, in the identified object in the second run-time environment;
   code for determining a representation of the action, according to the action identification, in the second run-time environment for the identified object; and
   code for executing the action using the representation, wherein the code for executing includes:
      code for converting a request identification that is part of the action identification to a further representation for the second run-time environment; and
      code for inserting the further representation into the second run-time environment.

10. The computer program product of claim 9 wherein the instructions further comprise code for returning a second message as a confirmation message to the first computer, the second message including an object identification and a response identification.

11. The computer program product of claim 9 wherein the code for converting uses a look-up table.

12. The computer program product of claim 9 wherein the code for executing comprises:
   code for extracting a second property representation of a property identified by the action identification;
   code for converting the second property representation to a first property representation for the first run-time environment; and
   code for returning to the first computer a second message as a result message with an object identification and a response identification, the response identification indicating the first property representation for the first run-time environment.

13. The computer program product of claim 9, wherein the code for executing comprises:
   code for converting a function identification and a parameter identification of the action identification to function and parameter representations for the second run-time environment;
   code for performing a function that is identified by the action identification using the function and parameter representations for the second run-time environment;
   code for converting parameters that result from performing the function into parameter representations for the first run-time environment; and
   code for returning a second message to the first computer with an object identification and a response identification, with the response identification indicating the parameter representations.

14. A computer communication system comprising a first computer operating in a first object-oriented run-time environment and a second computer operating in a second, different object-oriented run-time environment, wherein the first computer sends a first message with an object identification and an action identification to the second computer, the second computer comprising:
   a first module to identify an object in the second run-time environment according to the object identification;
   a second module to verify an existence of an action identified in the action identification in the identified object in the second run-time environment;
   a third module to determine a representation of the action in the second run-time environment for the identified object; and
   a fourth module to execute the action by using the representation and to return a second message as confirmation message to the first computer, the second message with object identification and response identification, wherein the fourth module is adapted to (a) convert a request identification that is part of the action identification to a further representation for the second run-time environment using a look-up table, and (b) insert the further representation into the second run-time environment.

15. The computer communication system of claim 14 wherein the fourth module is further adapted to:
    extract a second property representation of a property identified by the action identification;
    convert the second property representation to a first property representation for the first run-time environment; and
    return to the first computer a second message as a result message with an object identification and a response identification, the response identification indicating the first property representation for the first run-time environment.

16. The computer communication system of claim 14 wherein the fourth module is further adapted to:
    convert a function identification and a parameter identification of the action identification to function and parameter representations for the second run-time environment;
    perform a function that is identified by the action identification using the function and parameter representations for the second run-time environment;
    convert parameters that result from performing the function into parameter representations for the first run-time environment; and
    return a second message to the first computer with an object identification and a response identification, with the response identification indicating the parameter representations.

17. A computer program product embodied on a carrier and comprising computer readable instructions operable when executed to cause a processor to:
    receive a first message with an object identification and an action identification from a first computer with a first object-oriented run-time environment;
    identify an object in a second computer with a second, different object-oriented run-time environment, according to the object identification;
    verify the existence of an action, according to the action identification, in the identified object in the second run-time environment;
    determine a representation of the action, according to the action identification, in the second run-time environment for the identified object; and
    execute the action using the representation, wherein the instructions operable to execute the action comprise instructions operable to:
        convert a request identification that is part of the action identification to a further representation for the second run-time environment; and
        insert the further representation into the second run-time environment.

18. A computer program product embodied on a carrier and comprising computer readable instructions operable when executed to cause a processor to:
    receive a first message with an object identification and an action identification from a first computer with a first object-oriented run-time environment;
    identify an object in a second computer with a second, different object-oriented run-time environment, according to the object identification;
    verify the existence of an action, according to the action identification, in the identified object in the second run-time environment;
    determine a representation of the action, according to the action identification, in the second run-time environment for the identified object; and
    execute the action using the representation, wherein the instructions operable to execute the action comprise instructions operable to:
        extract a second property representation of a property identified by the action identification;
        convert the second property representation to a first property representation for the first run-time environment; and
        return to the first computer a second message as a result message with an object identification and a response identification, the response identification indicating the first property representation for the first run-time environment.

19. A computer program product embodied on a carrier and comprising computer readable instructions operable when executed to cause a processor to:
    receive a first message with an object identification and an action identification from a first computer with a first object-oriented run-time environment;
    identify an object in a second computer with a second, different object-oriented run-time environment, according to the object identification;
    verify the existence of an action, according to the action identification, in the identified object in the second run-time environment;
    determine a representation of the action, according to the action identification, in the second run-time environment for the identified object; and
    execute the action using the representation, wherein the instructions operable to execute the action comprise instructions operable to:
        convert a function identification and a parameter identification of the action identification to function and parameter representations for the second run-time environment;
        perform a function that is identified by the action identification using the function and parameter representations for the second run-time environment;
        convert parameters that result from performing the function into parameter representations for the first run-time environment; and
        return a second message to the first computer with an object identification and a response identification, with the response identification indicating the parameter representations.

* * * * *